(12) United States Patent
Koike et al.

(10) Patent No.: US 6,976,796 B2
(45) Date of Patent: Dec. 20, 2005

(54) METHOD AND JIG FOR HANDLING AND TRANSFERRING FUSION-SPLICED OPTICAL FIBERS

(75) Inventors: Rei Koike, Yokohama (JP); Kazunari Hattori, Yokohama (JP); Tomomi Moriya, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 61 days.

(21) Appl. No.: 10/434,106

(22) Filed: May 9, 2003

(65) Prior Publication Data

US 2003/0215195 A1 Nov. 20, 2003

(30) Foreign Application Priority Data

May 17, 2002 (JP) .......................... 2002-143644

(51) Int. Cl.[7] .............................................. G02B 6/255
(52) U.S. Cl. ........................... 385/96; 385/95; 385/136
(58) Field of Search ........................... 385/95–99, 137, 385/135, 136

(56) References Cited

U.S. PATENT DOCUMENTS

| | | | |
|---|---|---|---|
| 4,690,496 A | | 9/1987 | Bortolin et al. |
| 5,339,380 A | * | 8/1994 | Wysocki et al. ............. 385/136 |
| 6,728,452 B2 | * | 4/2004 | Nishimura .................. 385/100 |

FOREIGN PATENT DOCUMENTS

| | | | |
|---|---|---|---|
| EP | 0366110 | * | 5/1990 |
| EP | 0 366 110 A2 | | 5/1990 |
| EP | 1 094 346 A1 | | 4/2001 |
| JP | 06-109946 | | 4/1994 |
| JP | 9-113752 | | 5/1997 |

OTHER PUBLICATIONS

Shiraishi Kazuo., et al. "Beam Expanding Fiber Using Thermal Diffusion of The Dopant," Journal of Lightwave Technology, IEEE, New York, USA, vol. 6, No. 8, 1 pp: 1151–1161, XP000174447.

* cited by examiner

*Primary Examiner*—Leo Boutsikaris
(74) *Attorney, Agent, or Firm*—McDermott Will & Emery LLP

(57) ABSTRACT

A method for handling a fusion-spliced optical fiber and a transferring jig for transporting the optical fiber are provided. The jig is capable of holding the fusion-spliced optical fiber in a state in which a given tension is applied at the spliced portion, and stopping the application of such tension if needed. The jig is easy to transport and set to each of separate processing processes. In the method, a fusion-spliced optical fiber is clamped at coated portions thereof on both sides of the fusion-spliced portion by a pair of clamps of the jig and transported by the jig holding the optical fiber in a state wherein a given tension is applied thereto through the clamps.

9 Claims, 2 Drawing Sheets

METHOD AND JIG FOR HANDLING AND TRANSFERRING FUSION-SPLICED OPTICAL FIBERS

BACKGROUND OF THE INVENTION

The present invention relates to a handling method and a jig for transferring a fusion-spliced optical fiber from a fusion splicing process to one of processes such as thermal treatment or reinforcing treatment of the spliced portion of the optical fiber.

After the fusion-splicing of a pair of single-fibers or a pair of multi-fiber units, the exposed spliced portion of the optical fiber is generally reinforced by recoating with UV-cured resin or covering with a heat-shrinkable tube. In case that a typical single-mode optical fiber and a specialty-functional optical fiber, which are different in mode-field diameter, are connected together by fusion, the resulting optical fiber cannot obtain a practically allowable splice loss without further processing its spliced portion. Therefore, in one of known methods, the spliced portion and neighboring portion thereof are further processed by heating to form a smoothly expanded taper core diameter such that the optical fiber has a matched mode field diameter at the spliced portion. This process is known as a method for obtaining thermally defused expanded core (hereinafter referred to as TEC method).

Thus, a fusion-spliced optical fiber must be transferred to each position for such processing of the spliced portion. In Japanese Patent Laid-Open No. 6-109946, there is disclosed a typical method for transferring a fusion-spliced optical fiber to a processing position for reinforcing its spliced portion.

According to the disclosed method, two processing means, one for fusion-splicing of two optical fibers and other for reinforcing the spliced portion of the spliced optical fiber, are arranged on one apparatus and the fusion-spliced optical fiber is clamped and transferred by a swinging arm to the neighboring processing position for reinforcing the spliced portion of the optical fiber by heating a heat-shrinkable tube put thereon. The above method is applicable for transferring the optical fiber merely between two positions: from the fusion splicing stage to the reinforcing stage.

However, when the fusion-spliced optical fiber requires high temperature heat treatment of its spliced portion (i.e. the TEC process), recoating and/or testing thereof, the apparatus becomes large and very expensive for such various processes since it is arranged as one apparatus. Furthermore, the above processes may vary depending upon the form of optical fibers to be fusion-spliced and hence require specially designed processing devices. This makes the apparatus unable to change or add processing devices and tools used thereon. In other words, the apparatus cannot be universal in practice.

In view of the above-mentioned circumstances, the present invention is directed to a handling method and a portable transferring jig for transferring optical fibers spliced by a fusion-splicer to separate processing apparatuses, at any time and at different places, for carrying out a necessary post-splicing processing of the fusion-spliced optical fibers. The term "post-splicing processing" as used herein includes heat treatment, coating process, reinforcing process, etc. performed after fusion-splicing optical fibers.

The fusion-spliced optical fiber must be held by clamps at a constant specified tension without sagging while it is transported to any separate processing place. The optical fiber must be held not to be subject to extension by heat while its spliced portion is thermally treated to form a necessary TEC. Furthermore, the method and device must have superior transferability without much labor so that necessary positioning can be exactly done at respective positions for various processes.

Therefore, the present invention is intended to provide a portable transferring jig and a handling method using the transferring jig, which can hold fusion-spliced optical fibers at a given tension and stop the tensioning of the fibers as needed and which is easy to transport and set up at any separate processing place. The term "given tension" as used herein means the tension that is sufficient for preventing an optical fiber from sagging, but not so high as may cause the optical fiber to break.

SUMMARY OF THE INVENTION

An object of the present invention is to provide a method for handling a fusion-spliced optical fiber, in which method the optical fiber is provided with a given tension by clamping coated portions on both sides of the fusion-spliced portion of the optical fiber with a pair of clamps of a portable transferring jig during transportation of the optical fiber to, and/or during post-splicing processing of the optical fiber at, each of different locations therefor.

Another object of the present invention is to provide a transferring jig for transporting a fusion-spliced optical fiber to each of different processing places, which jig comprises a pair of clamps for holding coated portions of the optical fiber at both sides of the spliced portion, a tensioning means for applying a given tension to the optical fiber through the clamps, a means for restraining the tensioning of the optical fiber, and a locating means for locating the jig at each of different processing places.

PREFERRED EMBODIMENT OF THE INVENTION

Figure 1:
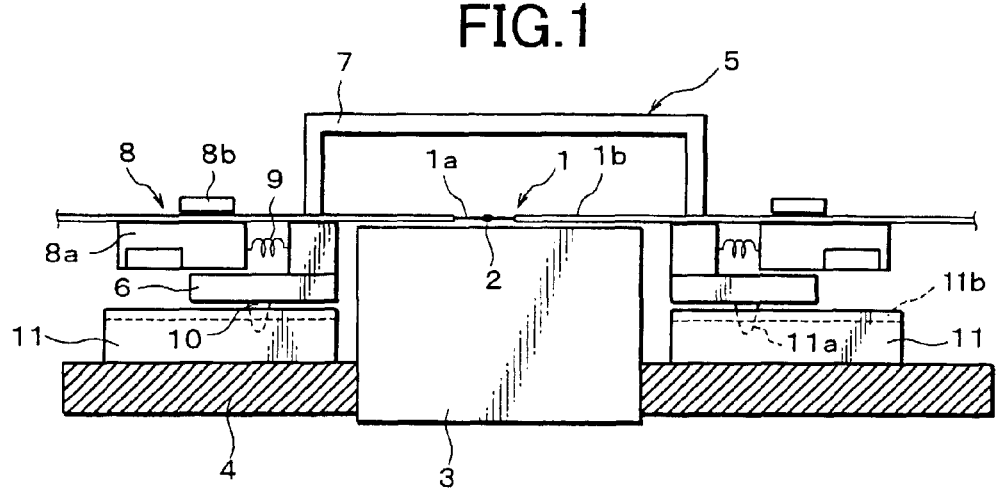
FIG. 1 is a schematic view illustrating an embodiment of the present invention at the completion of the fusion-splicing of optical fibers or at a different processing place for the processing (re-coating) of the spliced portion of the fibers.
Figure 2:
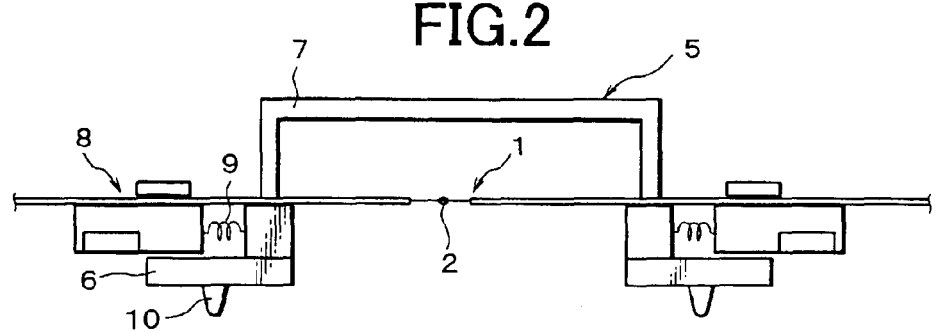
FIG. 2 is a schematic view illustrating an embodiment of the present invention when transporting a fusion-spliced optical fiber.
Figure 3:
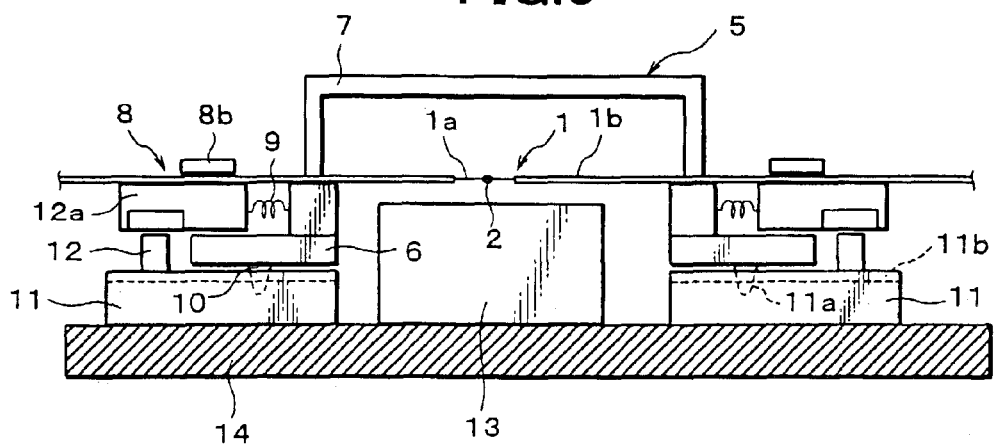
FIG. 3 is a view illustrating an embodiment of the present invention on a processing place for conducting heat treatment of a fusion-spliced optical fiber.

A preferred embodiment of the present invention will be described below in detail with reference to accompanying drawings. FIG. 1 illustrates an embodiment of the present invention applied at the end of a fusion-splicing process or at a later process on a different place. FIG. 2 is illustrative of an embodiment at the time of transporting a fusion-spliced optical fiber and FIG. 3 is illustrative of an embodiment at a place of a heat treatment process. In these figures, there is shown a fusion-spliced optical fiber 1, an exposed portion 1a of the optical fiber, a coated portion 1b of the fiber, a fusion-spliced portion 2, a fusion-splicer (or recoater) 3, a mounting table 4, a transferring jig 5, a clamp stand 6, a connecting arm 7, a clamp 8, clamp base 8a, a pressing plate 8b, a spring 9, a locating lug 10, a locating block 11, a magnet 12, a magnetic member 12a, a heating device 13 and a mounting table 14.

A pair of optical single fibers or multi-fiber units are butted at the end faces of the exposed portions 1a, in which the coated portion 1b are stripped off, and fused together by a fusion-splicer 3 mounted on a mounting table 4. The exposed portions 1a including the fusion-spliced portion 2 of the optical fiber require the post-processing for reinforcing it for protection against possible damage and breakage. The optical fiber formed by fusion splicing two optical fibers having different mode field diameters has a large splice loss and therefore requires processing of its spliced portion by the TEC method.

Therefore, the fusion-spliced optical fiber 1 is transferred to a place where heat-processing process or a reinforcing process is conducted. In this case, the optical fiber 1 must be transferred without bending and damaging its fusion-spliced portion 2 and adjoining portions and, furthermore, it must be promptly set on a specified position in the next process with no need of re-clamping the fiber and/or re-adjusting the tensioning of the fiber. The re-clamping and re-adjusting of the optical fiber on each process requires much time and labor, thereby increasing the manufacturing cost of the product.

The present invention provides a portable transferring jig 5 for holding and transporting the fusion-spliced optical fiber 1. This transferring jig 5 has a structure in which a pair of clamp stands 6 are connected by the connecting arm 7 and has a pair of clamps 8 each slidably mounted on the respective clamp stands 6. Each clamp 8 securely holds the optical fiber 1 between the clamp base 8a and the pressing plate 8b. The spring 9 is provided between an upstanding portion of the clamp stand 6 and the clamp 8 to press the clamp 8 outwards.

Each clamp stand 6 has a locating lug 10 formed on its bottom, which fits into a hole 11a formed in a locating block 11. A projection, such a locating lug, and a hole are herein referred to as locating means. The locating block 11 has a groove 11b communicating to the locating hole 11a in order to smoothly guide and fit the locating lug 10 of the clamp stand 6 into the locating hole 11a. The locating blocks 11 are provided on the both sides of the fusion-splicer 3. The locating blocks 11 can be omitted if the locating holes are made in the respective mounting table 4. It is also possible to form the locating lug 10 on the locating block 11 or the mounting table 4 and to provide the locating hole in the clamp stand 6.

In FIG. 1, before unclamping the fusion-spliced optical fiber 1 from the clamp mechanism of the fusion-splicer 3, the transferring jig 5 is placed in a manner wherein the fusion-splicer 3 is located between a pair of clamps 8 and the optical fiber 1 is clamped by respective clamps 8 at the coated portions 1b on both sides of the fusion-spliced portion 2 thereof. The optical fiber is then removed from the clamp mechanism of the fusion-splicer 3. The coated portions of the optical fiber 1 are clamped in a state in which the clamps 8 are pushed inwards against the force of springs 9, and consequently the optical fiber 1 is tensioned by springs 9 through the clamps 8.

Thereafter, the transferring jig 5 holding the fusion-spliced fiber 1 is removed from the place of the fusion-splicer 3. The transferring jig 5 is constructed such that the locating lugs 10 can be smoothly disengaged from the respective locating holes 11a made in the locating blocks 11 simply by lifting handholds (not shown) of the jig. The transferring jig 5 removed from the locating blocks 11 holds the fusion-spliced optical fiber 1 in the tensioned state without sagging as shown in FIG. 2. The transferring jig 5 with the optical fiber 1 is transported by hand to a following processing place or temporally stored as an uncompleted product on a dolly.

The optical fiber is desirably tensioned not to be loosen while it is transported to the next processing place and processed thereat. The tension T (gram) applied to the optical fiber is preferably in the range of more than 0 g per piece to 50 g included per piece and more preferably in the range of more than or equal to 10 g per piece to 20 g included per piece. The diameter of the glass portion 1a of the optical fiber is 125 µm, and the diameter of the coated portion 1b of the fiber is approximately 250 µm. If the fusion-spliced portion of the optical fiber in the no-tensioned state is heat-treated by the next process (e.g., TEC process), it may be bent. On the contrary, the spliced portion may be elongated if it is excessively tensioned and heated in the above process. Therefore, the tension of the optical fiber must be set to an adequate value in the above mentioned range by adjusting the spring force.

Now let us assume that the next process is to heat the spliced portion of the optical fiber by the TEC method as shown in FIG. 3. The transferring jig 5 holding the optical fiber in the state shown in FIG. 2 is transported to the next process and placed astride a heating device 13 mounted on a mounting table 14. The locating blocks 11 are disposed on both sides of the heating device 13 in the same way as shown in FIG. 1 for the case of the fusion splicing machine. The transferring jig 5 is located by its locating lugs in the specified positions on the locating block 11. The fusion-spliced portion 2 and neighboring portions of the optical fiber 1 is then heated by the heating device 13. The fusion-spliced portion 2 and its neighborhood are softened and, if the tensioning force from springs 9 should be still applied to the optical fiber in the above-mentioned state, the heated portions may be elongated.

To avoid the above, according to the present invention, the tensioning of the optical fiber is stopped (this, however, does not mean that the tension is made to zero). This is achieved by the following method. For example, each locating block 11 is provided with a magnet 12 and each clamp 8 is provided with a magnetic member 12a. In this construction, when the transferring jig 5 is mounted on the heating device 13, the magnets 12 attract the magnetic members 12a of the clamps 8 to stop the further movement of the clamps 8. Namely, once the transferring jig 5 is mounted on the heating device, the optical fiber 1 is prevented from being subjected to tension exceeding that applied to the fiber during the transportation.

Thus, the fusion-spliced portion 2 and its neighborhood of the optical fiber 1 is heated by the heating device 13 and softened but not sagging owing to the tension having been applied thereto before transportation. When the fusion-spliced portion and its neighborhood is softened, the tension of the fiber between the clamps becomes zero but the elongation of the fiber 1 does not take place since the movement of clamps 8 has been prevented by the above-mentioned stopping means. The movement of each clamp 8 may be stopped by manually screwing it on the clamp stand 6.

If the next process is a recoating process or a testing process in which the fusion-spliced portion and its neighborhood of the optical fiber 1 is not heated, the stopping of the movement of the clamps 8 is unnecessary, i.e., the attachment of the magnets 12 is not required. This stopping system is also unnecessary if the next process is to reinforce the spliced portion of the optical fiber 1 by heating a heat-shrinkable tube at a temperature not exceeding a specified point of softening the optical fiber. Namely, the transferring jig 5 can be used for these processing places in the same form as that shown in FIG. 1.

Figure 4A:
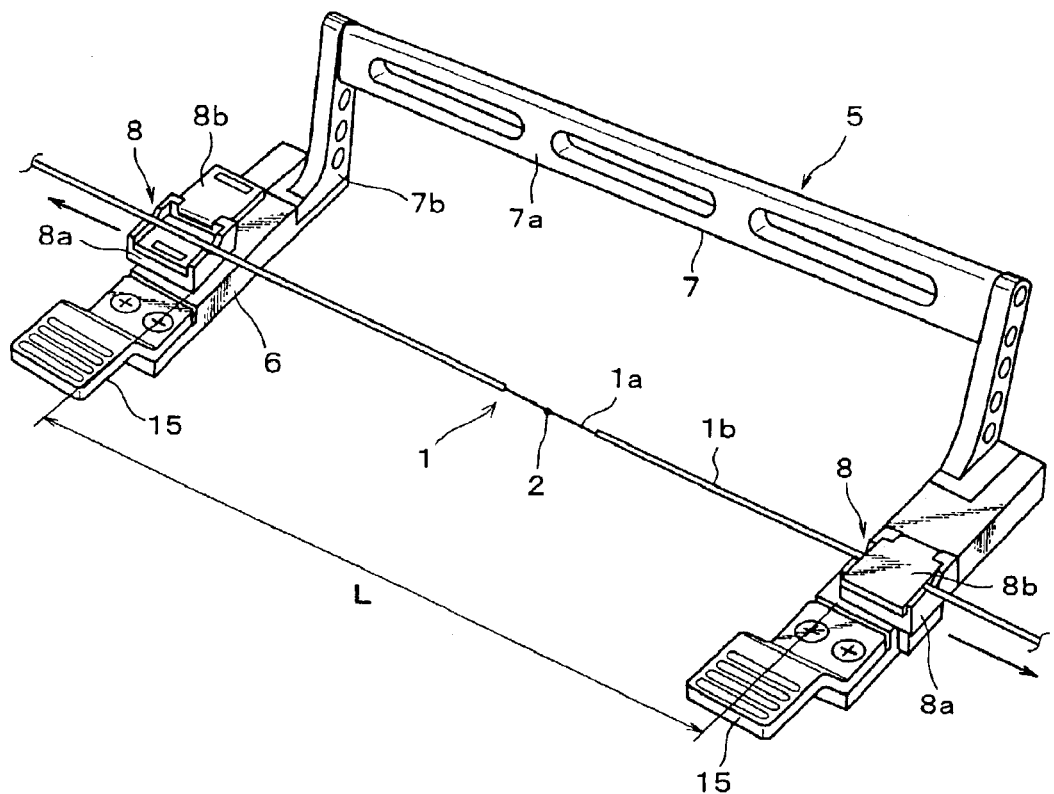
FIGS. 4A and 4B illustrate practical examples of a transferring jig according to the present invention.
Figure 4B:
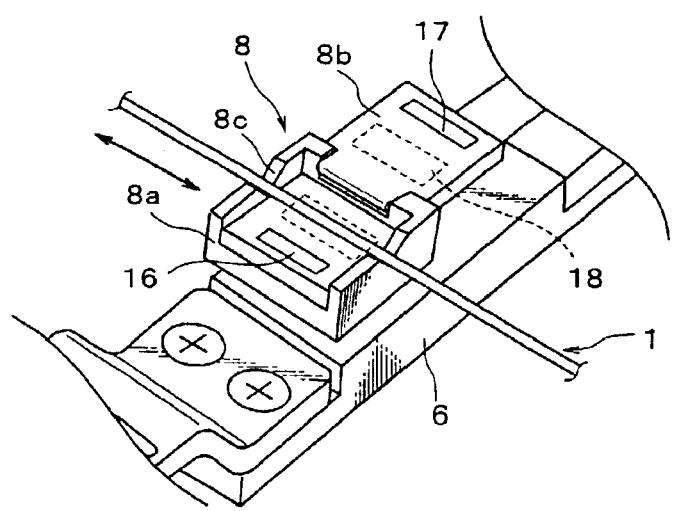

FIGS. 4A and 4B illustrate practical examples of a transferring jig according to the present invention. FIG. 4A is a perspective view of the transferring jig and FIG. 4B is an enlarged view of a clamp of the transferring jig. In FIGS. 4A and 4B, there is shown a handhold 15, a magnet 16, a magnetic member 17 and a friction sheet 18. Other parts similar to those shown in FIG. 1 are denoted by the same numerals.

As shown in FIG. 4A, the transferring jig 5 has an U-shaped construction in which a pair of clamp stands 6 are connected together by a rear side connecting arm 7 composed of a horizontal bar 7a provided at each end with a vertical bar 7b jointed thereto. The connecting arm has a plurality of openings in its elements to reduce its weight. The distance L between two clamps 8 is approximately 20 cm to 30 cm. Each clamp stand 6 is provided at its front side with a handhold 15 for transporting the transferring jig 5 by hands. A clamp 8 is mounted in the center area on each clamp stand 6 such that it can slide thereon in a direction parallel to the horizontal bar of the connecting arm 7.

As shown in FIG. 4B, the clamp 8 is composed of a clamp base 8a and a pressing plate 8b, which is turnably attached by a hinge to the clamp base 8a. The clamp base 8a has a guide groove 8c formed thereon for determining a position for clamping the optical fiber 1. The clamp base 8a also has a magnet 16 embedded in the front inside thereof. When the pressing plate 8b is turned over to close clamp base 8a, a magnetic member 17 embedded in the pressing plate 8b is attracted to the magnet 16 embedded in the clamp base 8a to securely hold the optical fiber between the pressing plate 8b and the clamp base 8a. The inside surface of the pressing plate 8b and the upper surface of the clamp base 8a are covered respectively with a friction sheet 18 to prevent the optical fiber from slipping when clamping the tensioned optical fiber.

A spring (not shown) is provided between an upstanding portion of the clamp stand 6 and clamp base 8a to press the clamp base 8a in the outward direction such that the clamp 8 is always pressed outward. However, the clamp 8 can be easily moved inward against the spring force. The clamp stand 6 is provided with a conical locating lug (not shown) at its bottom surface, as described before with reference to FIGS. 1 to 3.

The transferring jig 5 thus constructed is placed on a fusion-splicing place in a manner such that its connecting arm and horizontal bars straddle a fusion-splicer. On completion of the fusion-splicing of butted ends of two optical fibers, coated portions 1b on both sides of the spliced portion of the optical fiber are placed on respective clamp bases 8a of the transferring jig 5, and the positioning of the fiber is determined by the guide grooves 8c. The clamps 8 are moved inward and the pressing plates 8b are closed to securely clamp the respective coated portions 1b of the optical fiber 1 such that the clamps 8 hold the optical fiber in a state in which necessary tension is applied thereto. Namely, the transferring jig 5 holds the optical fiber 1 such that no sagging occurs to the fiber.

The transferring jig 5 thus holding the optical fiber 1 can be transported manually by gripping both handholds 15 from a processing place where a specific process has been completed to a next processing place. The transferring jig 5 can be easily mounted onto the next processing place from an upper position, the positioning thereof being done by the locating lugs. When the next process is a heat treatment of the optical fiber 1, the clamps 8 holding and tensioning the optical fiber can be prevented from further movement relative to the clamp stand 6 by a fixing member such as a magnet or screw.

As is apparent from the foregoing, according to the present invention, the fusion-spliced optical fiber can be promptly transferred from the fusion-splicer to any of different processing places separated from each other in a workshop. Furthermore, the optical fiber can be easily set without re-clamping on the next processing place and can be processed thereon without loosing and/or elongating of the optical fiber.

What is claimed is:

1. A method for handling a fusion-spliced optical fiber, wherein said optical fiber is moveably held by clamping coated portions on both sides of the fusion-spliced portion of said optical fiber with a pair of clamps of a portable transferring jig such that a given tension is applied to said optical fiber, said pair of clamps of a portable transferring jig such that a given tension is applied to said optical fiber, said pair of clamps being prevented from moving during heat treatment applied to said fusion-spliced portion.

2. A method according to claim 1, wherein the given tension T applied to the optical fiber is more than 0 g per piece and less than or equal to 50 g per piece.

3. A method according to claim 1, wherein the given tension T applied to the optical fiber is more than or equal to 10 g per piece and less than or equal to 20 g per piece.

4. A method according to claim 1, wherein a location of the transferring jig can be determined by a locating means thereof at a specified position in each of different post-splicing processes.

5. A portable transferring jig for handling an optical fiber, said jig comprising:
   a pair of clamps distanced from each other;
   wherein said pair of clamps have a function of providing said optical fiber with a given tension through outward movement of said pair of clamps clamping said optical fiber;
   wherein the jig is provided with a fixing member for temporarily fixing the pair of clamps.

6. A jig according to claim 5, wherein the jig is provided with locating means for locating at a specified position.

7. A jig according to claim 6, wherein the locating means is a lug with cone or pyramid.

8. A jig according to claim 6, wherein the locating means is a hole corresponding to cone or pyramid.

9. A jig according to claim 5, wherein the jig further comprises a handhold.

* * * * *